March 16, 1926. 1,577,145
G. W. OSBORN
REENFORCED HIGH PRESSURE FLOAT AND PROCESS OF MANUFACTURING THE SAME
Filed Feb. 13, 1925
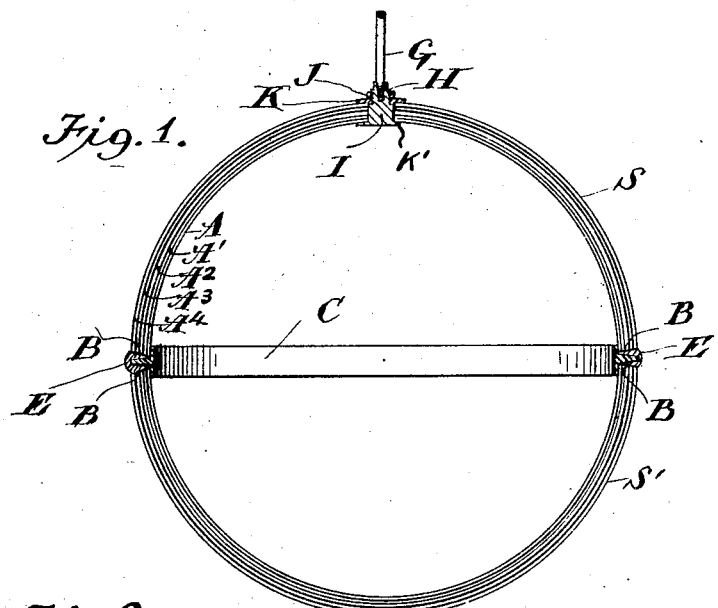
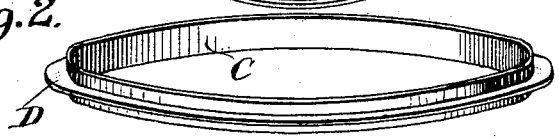
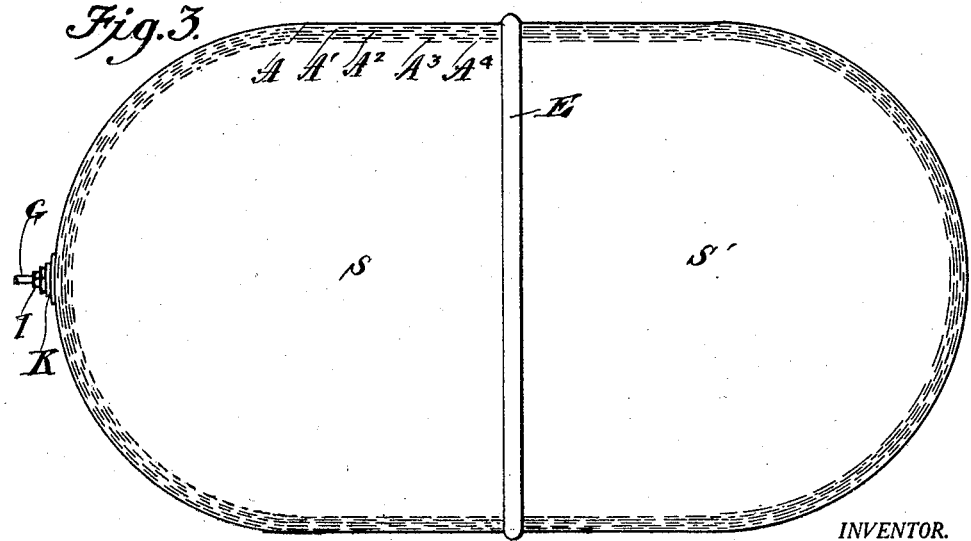
INVENTOR.
George Wm Osborn
BY Wm M Monroe
ATTORNEY.

Patented Mar. 16, 1926.

1,577,145

UNITED STATES PATENT OFFICE.

GEORGE W. OSBORN, OF CLEVELAND, OHIO.

REENFORCED HIGH-PRESSURE FLOAT AND PROCESS OF MANUFACTURING THE SAME.

Application filed February 13, 1925. Serial No. 8,922.

*To all whom it may concern:*

Be it known that I, GEORGE W. OSBORN, a citizen of the United States, and resident of Cleveland, in the county of Cuyahoga and State of Ohio, have invented certain new and useful Improvements in Reenforced High-Pressure Floats and Processes of Manufacturing the Same, of which I hereby declare the following to be a full, clear, and exact description, such as will enable others skilled in the art to which it appertains to make and use the same.

The objects of the invention are to provide reenforcing means for sheet metal floats to adapt them to endure high pressure in steam or hot oil or in other liquids under high pressure.

In the manufacture of sheet metal floats it has been customary to construct them of semi-spherical sheet metal parts formed of spun brass, steel or other metal, in which the crown of the semispherical part when spun receives the greatest amount of pressure and tooling when being constructed and the trimmed edges receive the least amount of tooling, and therefore the metal therein is not condensed and hardened to the same degree, and therefore the central or semicircular part adjacent to the joint or part of union is the weakest part of the float.

Also the wall of the float when composed of one integral sheet of metal, is placed under a uniform amount of pressure throughout and will not endure very high degrees of pressure.

To avoid these objections and limitations in the efficiency of the walls of the float, the improved wall is composed of laminations of sheet metal constructed by first spinning a semispherical inner layer from a sheet of metal into perfect shape over a metal form or mold, and then using the first sheet as a mold and spinning a second sheet thereover until the parts are closely fitted thereto, and continuously spinning further laminations thereover until the required thickness of wall is obtained. The circumferential edges of the cup shaped laminations are bevelled outwardly so that when the semispherical portions are superimposed upon each other and are placed over the vertical flanges of the T shaped ring the inner laminations will engage with the horizontal flange of the ring on both sides thereof, and the edges of the remaining laminations will recede one by one from the horizontal flange leaving an annular V shaped recess on each side of said horizontal flange.

The parts of the edges of the laminations and of the flange of the ring enclosing the recess are then heated to a welding heat by means of an oxyacetylene or other welding flame and the welding metal or alloy which may be of the same or similar material as that of the laminations is introduced and melted to unite with the walls of the cavity. In this manner the cavities are filled with molten metal which integrally unites with the flange D and with the edges of the laminations and forms a dove-tail joint preventing the escape of any of the laminations that might become loosened from any cause such as a violent blow.

The outer edges of the metal filling the cavities are then connected with molten metal and an external crown or bead formed circumferentially enclosing the float.

This method of supplying a band of welded material circumferentially about the float reenforces the float and also serves to integrally secure the free edges of the laminations together. The rod to which the float is attached is secured thereto by means of a threaded connection with a flanged plug or ferrule, all joints being welded in a similar manner, to be able to sustain high pressure. The device is exemplified in the construction illustrated in the figures, where Fig. 1 is a longitudinal section of a spherical float. Fig. 2 illustrates an elongated float. Fig. 3 is a perspective of the reenforcing ring.

In these views, A, $A^1$, $A^2$, $A^3$, $A^4$, represent the several laminations of which the semispheres S, $S^1$ are constructed. B, B, represent the inclined edges of the semispheres. C is the T shaped intermediate ring which is provided with the horizontal central rib D that extends between the edges of the laminations and the vertical portions of this ring overlap the edges of the opposed inner laminations and reenforce the same, and E is the crowned bead composed of welding metal that extends between the edges of the laminations and the rib D on each side thereof, and fills the annular and angular spaces F at the sides of said rib.

The end of the rod G to which the float is attached is screw threaded and is inserted in the screw threaded opening H in the flanged plug or ferrule I. The outer end of this plug is screw threaded at J and a nut or threaded washer K is screwed tightly thereover, thus clamping the laminations tightly together.

Before securing the edges of the semicylinders together the edges of the flange K' upon the inner end of the plug are welded in the same manner to the inner lamination and the nut washer is similarly welded to the projecting part of the plug and to the outer lamination. In this manner all joints are hermetically sealed and the amount of pressure that the walls of the float are enabled to sustain is greatly increased by the multiple number of laminations, upon the principle that each lamination will absorb a large amount of pressure before the pressure will extend to the next layer.

Having described the invention, what I claim as new and desire to secure by Letters-Patent is:

1. The hereinbefore described process of constructing a high pressure sheet metal float, consisting in forming two semispherical bodies by first spinning a pair of semispherical segments from sheet metal, and thereafter spinning and superimposing thereon similar semispherical sheets of metal closely fitted to the same and to each other, until a number of independent laminations have been assembled, next bevelling outwardly the edges of the semispherical portions in each semisphere thus constructed when assembled together, approximating said edges of said pair of semispheres together and inserting the horizontal flange of a T shaped ring between them, introducing welding metal into the annular V shaped cavities thus formed between said edges and said flange and integrally uniting the same at a welding heat with said edges and with the sides of said flange.

2. The hereinbefore described process of constructing a high pressure sheet metal float, consisting in forming two semispherical bodies by first spinning a pair of semispherical segments from sheet metal, and thereafter spinning and superimposing thereon similar semispherical sheets of metal closely fitted to the same and to each other, until a number of independent laminations have been assembled, next bevelling outwardly the edges of the semispherical portions in each semisphere thus constructed when assembled together, approximating said edges of said pair of semispheres together and inserting the horizontal flange of a T shaped ring between them, introducing welding metal into the annular V shaped cavities thus formed between said edges and said flange and integrally uniting the same at a welding heat with said edges and with the sides of said flange and finally forming an external annular crown or bead by applying molten welding metal over the outer edge of said flange and uniting the same with the welding metal in said recesses.

3. A laminated hollow sheet metal float composed of distinct sheet metal semispherical hollow bodies, each body being composed of an inner semispherical sheet metal member, and closely fitting outer sheet metal laminations superimposed thereon, and a central reenforcing ring provided with a horizontal member against which the circumferential edges of said laminations are opposed and means for integrally connecting said edges of said laminations and the sides of said horizontal member together.

4. A laminated hollow sheet metal float, composed of semispherical hollow bodies, each body being composed of an inner semispherical sheet metal member and closely fitting outer sheet metal laminations separately superimposed thereon, and a circumferential central reenforcing ring to which the edges of said laminations in said bodies are secured, said ring being provided with a central outwardly projecting flange passing between the edges of said segments, and also provided with lateral members overlapping the inner sides of said segments.

5. A laminated hollow sheet metal float, composed of semispherical hollow bodies, each body being composed of an inner semispherical sheet metal member and closely fitting outer sheet metal laminations superimposed thereon, and a central reenforcing ring to which the edges of said laminations in said bodies are secured, said ring being provided with a central outwardly projecting flange passing between the edges of said segments, and also provided with lateral members overlapping the inner sides of said segments, and means for integrally connecting said ring to the edges of said segments.

6. A laminated hollow sheet metal float composed of semispherical hollow bodies, each body being composed of an inner semispherical sheet metal member and closely fitting outer sheet metal laminations superimposed thereon, and a central intermediate reenforcing ring and means for integrally securing said parts together.

7. A hollow sheet metal float composed of opposed pairs of distinct semispherical layers of sheet metal assembled together and an intermediate metal ring to which the opposed edges of the pairs of semispherical layers are welded.

8. In a laminated float, a float body composed of opposed portions, each portion comprising a multiple number of distinct layers of sheet metal superimposed upon each other, a ring intermediate of the opposed edges of said body portions, the edges of said opposed laminations being outwardly bevelled to provide V shaped annular recesses encircling said body on each side of said ring, said recesses being filled with welding metal integrally attached to said ring and edges.

In testimony whereof, I hereunto set my hand this 5th day of February 1925.

GEORGE W. OSBORN.